Dec. 21, 1965  M. GOTTFRIED  3,224,415
PNEUMATIC IMMOBILIZING DEVICE FOR ANIMALS AND THE LIKE
Filed Sept. 10, 1964

INVENTOR
*Max Gottfried.* even# United States Patent Office 3,224,415
Patented Dec. 21, 1965

3,224,415
PNEUMATIC IMMOBILIZING DEVICE FOR ANIMALS AND THE LIKE
Max Gottfried, Rossford, Ohio, assignor to Jobst Institute, Inc., Toledo, Ohio, a corporation of Ohio
Filed Sept. 10, 1964, Ser. No. 395,364
5 Claims. (Cl. 119—96)

This invention relates to a device used by veterinarians, and others who find it necessary to immobilize animals, for purpose of taking X-rays, making a diagnosis or giving first aid in case of an accident.

The present method of immobilizing the body of animals is by wrapping them tightly with many turns of bandages in various ways according to the location of the desired X-rays, or nature of the illness and/or accident. The present methods of immobilizing the body of animals is not only time consuming, but awkward and seldom satisfactory.

It is therefore the principal object of this invention to provide an entirely new method of immobilizing the body of any animal by means of a pneumatic device that fits over the body of an animal lying prone on a flat surface to which it is firmly held by the inflated portion of the device.

Another object of this invention is to provide a pneumatic immobilizing device for animals and the like, that does not require the use of bandages wrapped around the body of the animal.

Another object of this invention is to provide a pneumatic immobilizing device for animals and the like that is entirely portable and can therefore be used wherever desired, be it in an animal hospital or on the street where an animal may lay seriously injured.

Another object of this invention is to provide a pneumatic immobilizing device for animals that will work equally as well on infants and small children.

Still another object of this invention is to provide a pneumatic immobilizing device for animals and the like that takes up a minimum of space when not in use, by reason of its lack of mechanisms, which are usually bulky to say the least.

Figure 1:
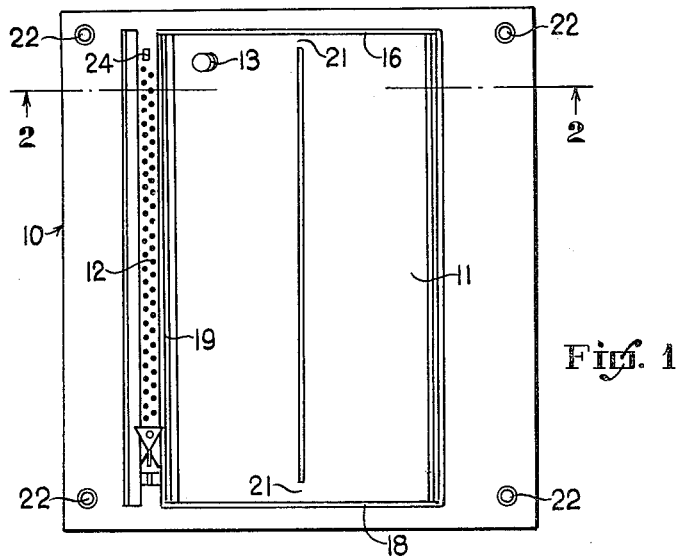
Figure 2:
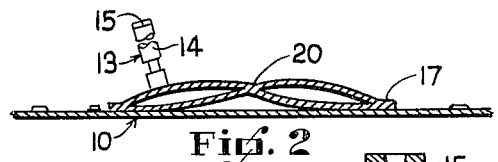
Figure 3:
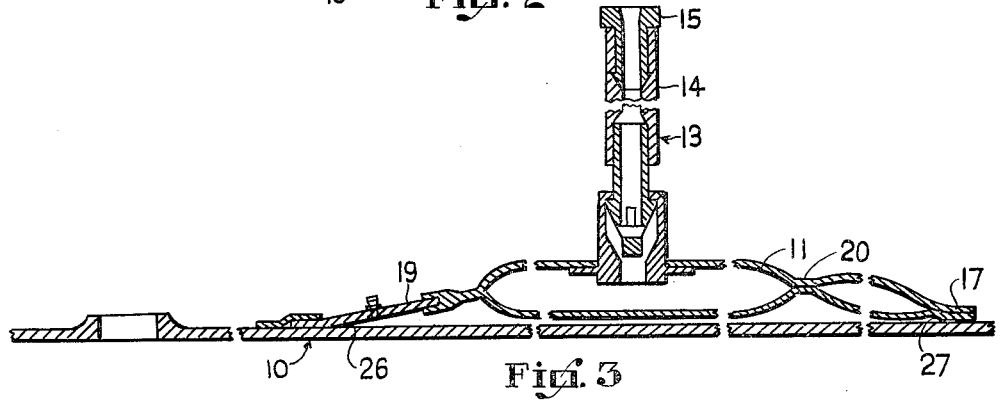
Figure 4:
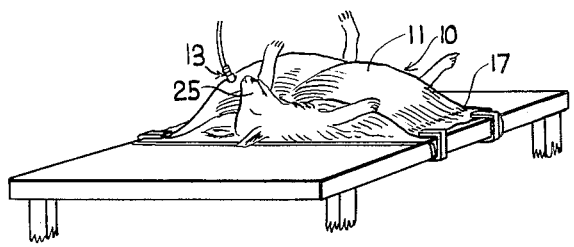

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIGURE 1 is a top view of this invention.
FIGURE 2 is a sectional view of this invention taken along line 2—2 of FIGURE 1 and viewed in the direction indicated by the arrows.
FIGURE 3 is an enlarged sectional view similar to that of FIGURE 2.
FIGURE 4 is a pictorial view of this invention in actual use.

Like characters of reference are employed to designate like parts in the specification and throughout the several views of the drawing.

Referring now to the accompanying drawing in detail, the invention consists of two basic parts, namely, the flat rectangular sheet of plastic 10 and the inflatable portion 11. The plastic used throughout the construction of this device is preferably 12 mil polyvinyl chloride that has been polished clear. The aforesaid inflatable portion 11 has a separating side fastening member 12 that extends the full length of one side of this invention. The aforesaid inflatable portion 11 is provided with a combination inlet and outlet push-pull valve 13 which is so designed and constructed as to permit the inflatable portion 11 to be either inflated or deflated, with equal ease. The aforesaid valve 13 is opened by pulling it outward and closed by pushing inward. A rubber tube 14 having a slip type of connector 15 secured to the upper end thereof permits this invention to be connected to any desired source of fluid pressure. The aforesaid inflatable portion 11 of this invention is electronically heat sealed along its entire periphery which is indicated in the drawing by the reference characters 16, 17, 18, and 19. The inflatable portion 11 is actually divided into two separate compartments by reason of the centrally located longitudinal seal 20 which naturally constricts the ballooning of the inflatable portion of this invention. The passage-way 21 that is formed at each end of the inflatable portion 11 by the termination of the longitudinal seal 20 just short of the two ends that have already been noted by the reference characters 16 and 18. The aforesaid passageways 21 actually cause the inflatable portion 11 of this invention to become one single chamber although this fact is apt to be misconstrued by the sectional view shown in FIGURES 2 and 3 of the drawing. Looking now at FIGURE 1 of the drawing one will see that this invention is provided with a grommet 22 in each corner of the aforesaid rectangular sheet of plastic 10 in order that this device may be tied down to any table or similar surface.

The way in which this pneumatic immobilizing device for animals and the like is used is as follows. The side fastening member 12 which is preferably of the zipper type, is opened and disconnected at the point indicated in FIGURE 1 of the drawing by the reference character 24. This allows the inflatable portion 11 to be folded back along its periphery 17 which in effect acts as a hinge. The animal 25 is now placed on the aforesaid sheet of plastic 10 between the points indicated in FIGURE 3 of the drawing by the reference characters 26 and 27. The inflatable portion 11 is now folded back over the body of the animal 25 like a blanket and the slide fastening member 12 is closed. The inflatable portion 11 is now inflated by one blowing into the aforesaid valve 13 or by connecting the valve to any other desired source of fluid pressure. (Air, of course, is a fluid.) The valve 13 is closed by pushing the same down towards the inflatable portion 11 of this invention. To remove the device from the animal all one has to do is to pull the valve 13 outward in order to release the pressure in the inflatable portion 11 and then open the side-fastening member 12.

While in the foregoing specification there has been disclosed a presently preferred embodiment of the invention, it will be appreciated that as indicated at certain points in said specification variations and modifications may be made. Consequently, it will be understood that the invention is not to be deemed to be limited to the precise details of construction of a presently preferred embodiment thus disclosed by way of example and it will be understood that the invention includes as well, all such changes and modifications in the parts, and in the construction, combination and arrangement of parts as shall come within the purview of the appended claims.

I claim:
1. A pneumatic immobilizing device for animals and the like comprising a sheet of material to which is secured an inflatable portion constituting a restraining enclosure, and means of disconnecting one edge of the said inflatable portion and folding the said inflatable portion back into an open position, and a valve secured to the said inflatable portion, the said valve providing a means of inflating the said inflatable portion with a fluid, the said inflatable portion being placed over the body of an animal that has been placed on the said sheet, and firmly secured thereby immobilizing the said animal for a desired length of time.

2. A pneumatic immobilizing device for animals and the like comprising a rectangular sheet of polyvinyl chloride plastic that has been polished clear and to which is secured an inflatable portion constituting a restraining enclosure and means of disconnecting one edge of the said inflatable portion and folding the said inflatable portion back into an open position, and a valve secured to the said inflatable portion, the said valve providing a means of inflating the said inflatable portion with a fluid, the said inflatable portion being placed over the body of an animal that has been placed on the said sheet, and firmly secured thereby immobilizing the said animal for a desired length of time.

3. A pneumatic immobilizing device for animals and the like comprising a rectangular sheet of polyvinyl chloride plastic that has been polished clear and to which is secured an inflatable portion that is made of the same material as that of the said rectangular sheet and constituting a restraining enclosure, means of disconnecting one edge of the said inflatable portion and folding the said inflatable portion back into an open position, and a valve secured to the said inflatable portion, the said valve providing a means of inflating the said inflatable portion with a fluid, the said inflatable portion being placed over the body of an animal that has been placed on the said sheet, and firmly secured thereby immobilizing the said animal for a desired length of time.

4. A pneumatic immobilizing device for animals and the like comprising a rectangular sheet of polyvinyl chloride plastic that has been polished clear and to which is secured an inflatable portion that is made of the same material as that of the said rectangular sheet and constituting a restraining enclosure, a side fastening member in the form of a zipper that disconnects one edge of the said inflatable portion and folding the said inflatable portion back into an open position, and a valve secured to the said inflatable portion, the said valve providing a means of inflating the said inflatable portion with a fluid, the said inflatable portion being placed over the body of an animal that has been placed on the said sheet, and firmly secured thereby immobilizing the said animal for a desired length of time.

5. A pneumatic immobilizing device for animals and the like comprising a rectangular sheet of polyvinyl chloride plastic that has been polished clear and to which is secured an inflatable portion that is made of the same material as that of the said rectangular sheet and constituting a restraining enclosure, a side fastening member in the form of a zipper that disconnects one edge of the said inflatable portion and folding the said inflatable portion back into an open position, and a push-pull valve secured to the said inflatable portion, the said push-pull valve providing a means of inflating the said inflatable portion with a fluid, the said inflatable portion being placed over the body of an animal that has been placed on the said sheet, and firmly secured thereby immobilizing the said animal for a desired length of time.

References Cited by the Examiner
UNITED STATES PATENTS

| | | | |
|---|---|---|---|
| 1,548,241 | 8/1925 | Anderson | 251—353 X |
| 2,028,060 | 1/1936 | Gilbert | 47—23 |
| 2,563,501 | 8/1951 | Sperling | 128—134 |
| 2,719,986 | 10/1955 | Rand | 5—348 |
| 2,943,859 | 7/1960 | Koski et al. | 273—189 |
| 3,003,164 | 10/1961 | Calvelage | 128—134 X |

ALDRICH F. MEDBERY, *Examiner.*

SAMUEL KOREN, *Primary Examiner.*